United States Patent [19]

Hanechak et al.

[11] Patent Number: 4,704,769
[45] Date of Patent: Nov. 10, 1987

[54] FISH FILLETING APPARATUS AND METHOD

[76] Inventors: Edward S. Hanechak; Rita A. Hanechak, both of 118 Spring St., Johnstown, Pa. 15906

[21] Appl. No.: 855,930

[22] Filed: Apr. 25, 1986

[51] Int. Cl.⁴ ............................................. A22C 25/16
[52] U.S. Cl. ............................................. 17/46; 17/56
[58] Field of Search ........................... 17/56, 69, 46

[56] References Cited

U.S. PATENT DOCUMENTS

| 3,052,914 | 9/1962 | Luedtke | 17/7 |
| 3,290,720 | 12/1966 | Gordon | 17/7 |
| 3,672,002 | 6/1972 | Penman | 17/69 |
| 3,820,196 | 6/1974 | Penman | 17/46 |
| 4,037,294 | 7/1977 | Cowie | 17/56 |
| 4,524,513 | 6/1985 | Intini, Jr. | 30/149 |
| 4,593,432 | 6/1986 | Hazenbroek | 17/46 |

Primary Examiner—Willie G. Abercrombie
Attorney, Agent, or Firm—Arnold B. Silverman; Joyce L. Morrison

[57] ABSTRACT

An apparatus for deboning fish comprising a block and a filleting tool is disclosed. The block contains a curved edge for placement of the fish, rib cage down. A hand secures the fish on the block. The filleting tool has a handle and a blade that contains a flared portion. The tool is inserted at the dorsal backbone near the head. The tool is then progressively urged to the end of the rib cage. This method separates the backbone, rib cage and other bones from the flesh.

18 Claims, 17 Drawing Figures

FISH FILLETING APPARATUS AND METHOD

BACKGROUND OF THE INVENTION

1. Field of the Invention

This invention relates to fish deboning apparatus and method of using the apparatus.

2. Description of the Prior Art

Deboning fish can be a frustrating, time-consuming problem. Traditional methods involve using a simple knife to remove the bones or after cooking, using a fork to separate the meat from the bones. Other methods involve tools that can partially destroy the integrity of the fish flesh or that are not effective in removing the bones or that are time consuming to use.

U.S. Pat. No. 3,052,914 discloses a device for filleting fish wherein an eviscerated fish is placed over a curved stand and a clamping member is brought down against the spine and held with a hand to secure the fish. The filleting tool is brought down on the fish spine and then pressed downwardly.

U.S. Pat. No. 4,037,294 discloses a machine for filleting fish in a processing plant wherein a fish is placed on a carrier saddle and a pair of longitudinal cuts are made on either side of the spine of the fish. Ploughs are inserted into the cuts during the movement of the carrier which separates the bone from the fish meat.

U.S. Pat. Nos. 3,672,002 and 3,820,196 disclose a deboning tool which consists of a handle with blades disposed at each end. The blade is concave with a linear cutting edge on one side and a curved cutting edge on the other side. The apex of the tool is placed into the slit near the head with the curved edge embracing the rib cage and the linear edge extending through the inner skin surface and is moved along the slit shearing the meat from the rib cage.

U.S. Pat. No. 3,290,720 discloses a combination knife and eviscerating tool. The tool is positioned so that the spoon-shaped eviscerating tool is in an upward position. The point of the blade is inserted and pushed towards the tail of the fish so that the web portion slits the underside of the fish. The device is then inverted to eviscerate the fish.

In spite of these prior disclosures, there remains a need for a simple compact apparatus that will safely and effectively remove substantially all of the fish bones while leaving the fish flesh virtually intact.

SUMMARY OF THE PRESENT INVENTION

The present invention has met the above-described need by providing an apparatus that removes substantially the entire skeletal system. The apparatus consists of two parts. The filleting tool has a handle and a cutting edge. The cutting edge is preferably lobed, and has a flared portion.

The filleting tool is preferably used in combination with a block. The block is designed to conform to a fish rib cage. The fish after being eviscerated is placed with its rib cage on the block. The filleting tool is inserted near the region from which the head has been removed at the dorsal backbone between the bone and the flesh. The tool is pushed rearwardly towards the tail while the fish is supported on the block. The flared portion allows the smaller bones to remain attached to the skeleton.

It is an object of the invention to provide a rapid means for separating the consumable portion of a fish from the bones.

It is an object of the present invention to provide a filleting apparatus that efficiently removes substantially all of the fish bones.

It is an object of the present invention to provide a filleting apparatus comprising a block and a filleting tool.

It is an object of the invention to provide a safe, efficient and easy to use fish filleting system.

It is an object of the invention to clean a fish with minimum damage to the useable parts of the fish.

These and other objects of the present invention will be more fully understood from the following description of the invention.

DESCRIPTION OF THE PREFERRED EMBODIMENTS

Figure 1:
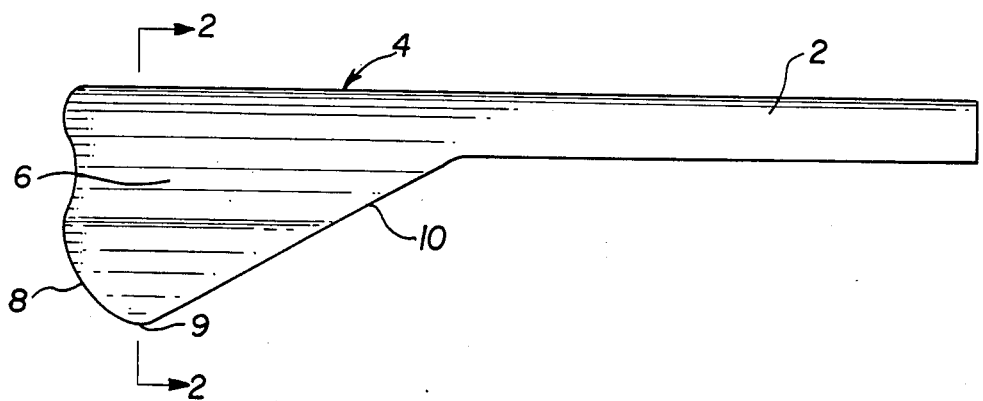
FIG. 1 is a side view of the filleting tool of the present invention.
Figure 2:
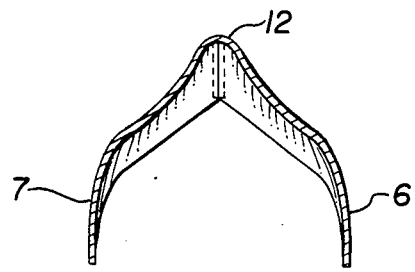
FIG. 2 is a cross-sectional view of the filleting tool of FIG. 1 taken through 2—2.
Figure 3:
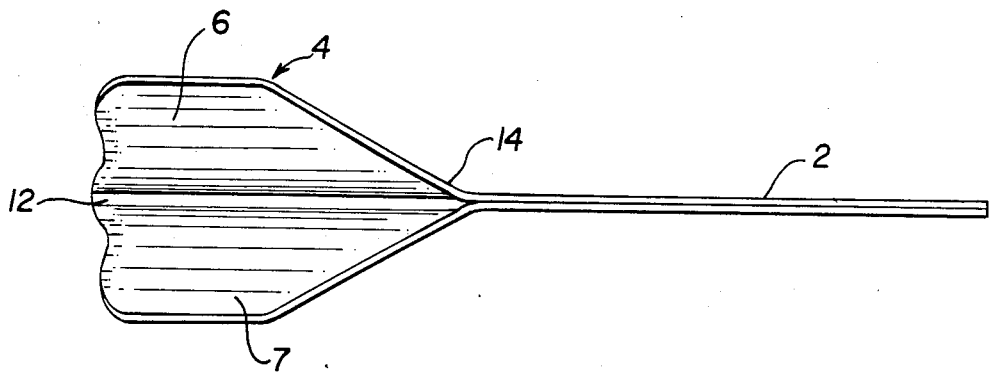
FIG. 3 is a bottom plan view of the filleting tool of the present invention.
Figure 4:
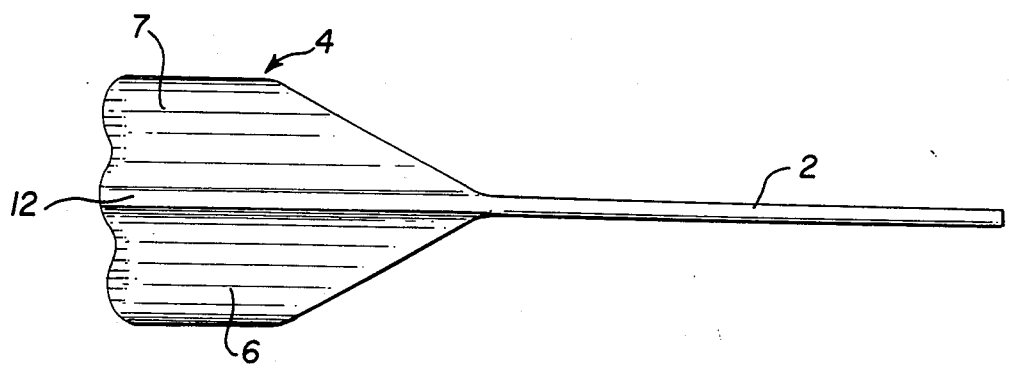
FIG. 4. is a top plan view of the filleting tool of the present invention.
Figure 5:
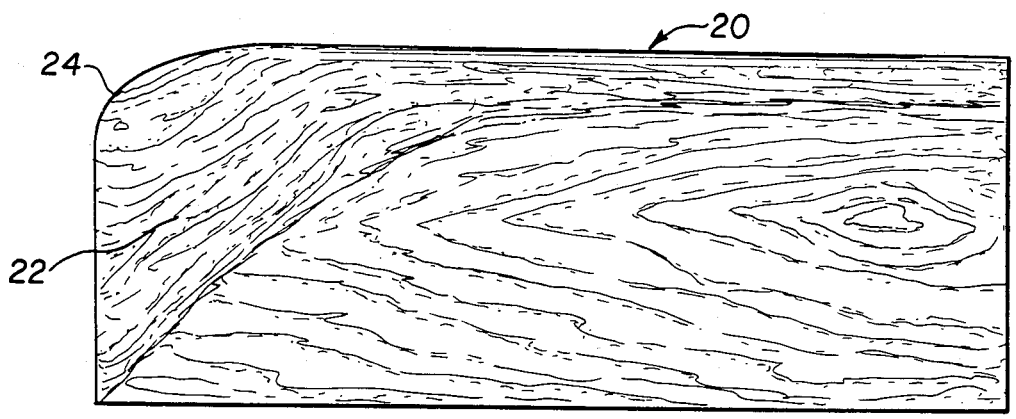
FIG. 5 is a front elevational view of the block of the present invention.
Figure 6:
FIG. 6 is a top elevational view of the block of the present invention.
Figure 7:
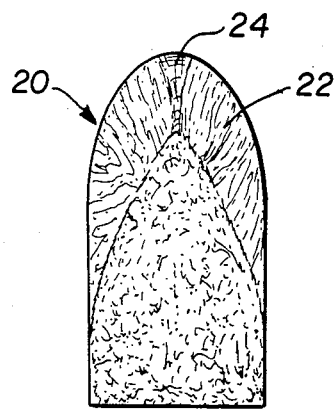
FIG. 7 is a rear elevational view of the block of the present invention.
Figure 8:
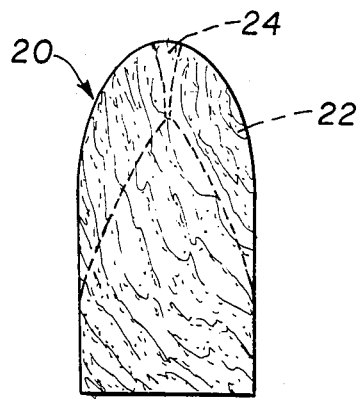
FIG. 8 is a front elevational view of the block of the present invention.

FIGS. 1-4 show the filleting tool of the present invention. The tool has a handle 2 and the blade 4. The blade is hollow and generally downwardly diverging. The blade 4 has a leading edge 8, a trailing edge and an intermediate connecting edge. The leading edge 8 is a cutting edge. The blade 4 preferably has downwardly diverging lobes and preferably two lobes. The blade lobes 6, 7, in the form shown in FIG. 1 have a forward or leading edge 8 which extends downwardly to a lower point 9 and a rearwardly, upwardly extending edge 10 which merges into handle 2. The rearwardly, upwardly extending edge 10 is flared. Handle 2 is preferably round to accomodate a better grip, but may be flat, hollow, downwardly open and the like. The blade 4 and handle 2 are preferably made as a substantially rigid unit and may be made of any suitable material such as stainless steel, rubber, fiberglass, synthetic resin, aluminum or plastic, for example, with or without suitable protective coatings.

The handle 2 can be of any dimension as long as it is adaptable to be gripped by a hand or other suitable means. For use on trout and fish of like sizes, the length of the handle can be from about 3 inches to about 8 inches, but is preferably about 6 inches. The height can be from about ½ inch to about 3 inches, but is preferably about ½ inch. The width of the handle can be from about ⅛ inch to about 1½ inches but is preferably about ⅜ inch thick.

The handle may have integrally formed surface irregularities (not shown) such as, for example, indentations or elongated strips to provide a better grip. The handle may be formed from two pieces and include pivot means between the blade and gripping handle. The handle may be elongated and have rounded edges or may be circular in dimensions. The handle may include a fish scaler.

The blade and handle may be one molded, stamped or pressed unit or may be two pieces securely attached as by mechanical fasteners in the general region of number 14. The amount of flaring of the blade 4 should be sufficient to permit the dorsal backbone of the average fish to pass through the opening.

The blade can be of any desired dimensions which are related to fish size. Referring to FIG. 1, it is preferred that the blade be about 2 inches to about 4 inches in length from the end 14 of the handle 2 to the free end of the blade 4, and more preferably about 2½ inches. The leading edge can be about 2 inches to about 4 inches in height, but is prefereably about 1¾ inches to about 2 inches in height and about 1 to 2 inches, preferably about 1½ inches wide. The blade preferably has a generally wishbone shape.

The taper in the blade provides a pilot surface effect to center the blade on the fish.

The filleting tool may advantageously be used in association with the block shown in FIGS. 5-8 and 10. The block 20 can be of any dimensions but is preferably generally rectangular in shape in plane and shaped to conform to the general dimensions of the fish. The block should preferably have a portion that is designated to conform to the rib cage of the average fish. The filleting tool may be empolyed to effect fist filleting by solely the leading edge 8 of the blade 4 of the filleting tool. Relative movement is established in a generally opposed direction between the supporting block 20 and the leading edge 8 of the blade 4.

The dimensions of the block are preferably about 6 inches to about 8 inches in length, about 3 to about 5 inches in height and about 1 inch to about 2 inches in width. The rear portion 22 of the block preferably is tapered 24. This facilitates easy placement and securing of the fish on the block.

The block can be made of any material including, but not limited to, wood, rubber, synthetic resinous material, plastic, fiberglass, metal, such as aluminum, stainless steel, and the like.

Figure 16:
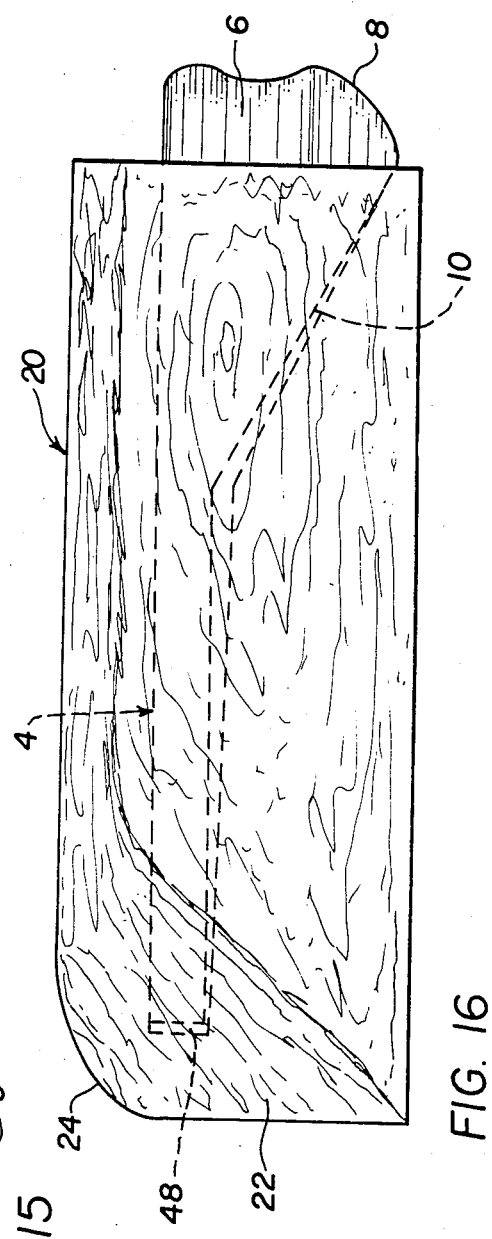
FIG. 16 is a side elevational view of an alternate embodiment of the block.

FIG. 16 shows an embodiment of the supporting block 20 which contains a hollow recess or a drawer 48 to store the tool. The recess 48 preferably generally corresponds to the outer dimensions of the tool. In addition, the recess may taper inwardly towards the closed end of the opening so the tool will fit snugly into the block 20.

Figure 9:
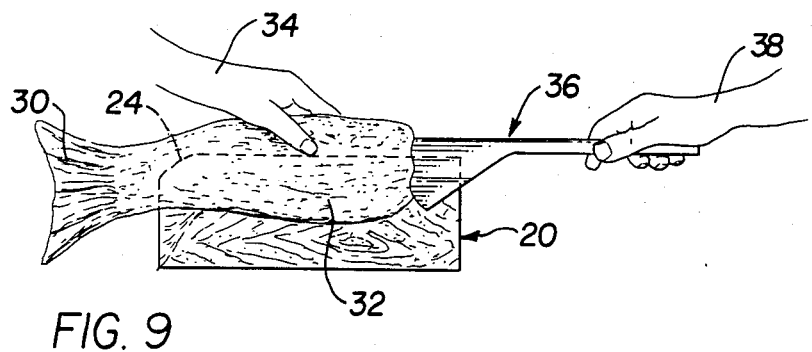
FIG. 9 is a partially schematic view of a fish with the block and filleting tool in use.
Figure 10:
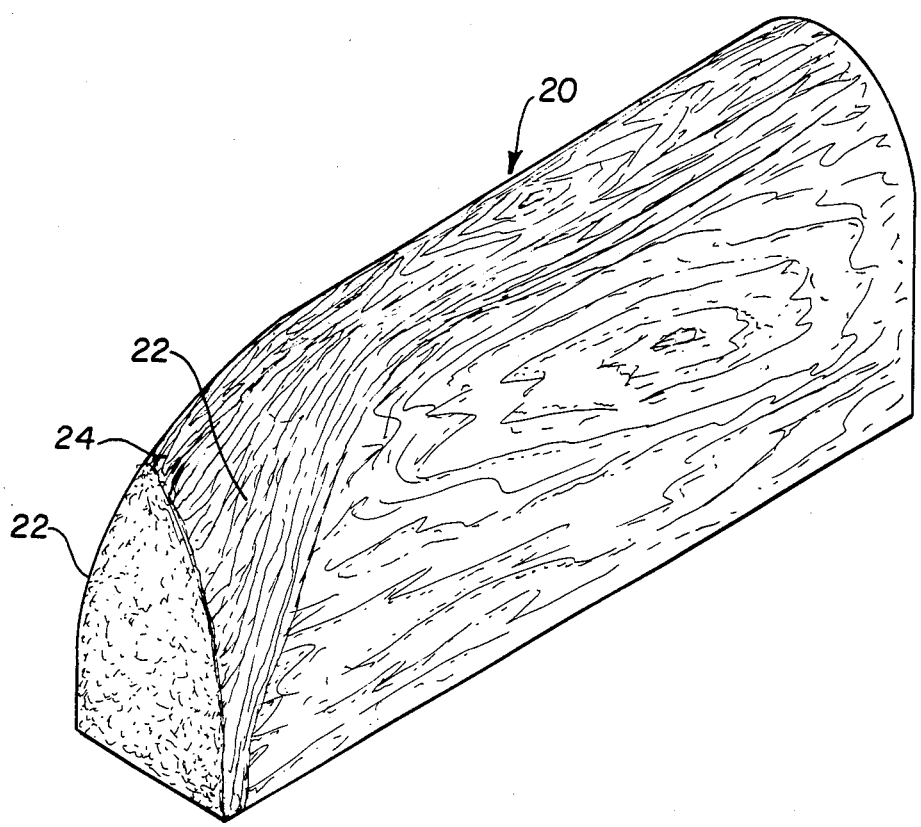
FIG. 10 is a perspective view of the block.

The method of using the above-described supporting block and filleting tool is illustrated in FIG. 9. The fish may be first eviserated, field dressed and beheaded. The fish 30 is then placed with rib cage 32 on the block 20 by sliding the front portion onto the block at the rear curved end of the block 24 and urging the fish forward. The fish is held securely in place on the supporting block by one hand 34 or other suitable means. The rib cage 32 is secured in intimate generally complementary contact with the block prior to inserting the filleting tool 36. The filleting tool 36 is placed in the other hand 38. The filleting tool 36 is inserted generally between the dorsal backbone and the flesh near the head of the fish. The filleting tool 36 is pushed towards the tail of the fish using slightly downward pressure and then the blade 4 is subsequently progressively moved at about a 15° angle position in a generally linear direction. This motion is continued until the tool reaches the end of the rib cage 32. As the filleting tool 36 is moved towards the end of the rib cage 32, the backbone, rib cage 32 and substantially all of the bones are progressively separated from the flesh by the intervention of the blade 4. The smaller bones which are secured to the backbone will tend to deform under the influence of the blade 4 while remaining attached to the backbone. At this point, the rib cage 32 is separated from the flesh. The rib cage 32 is separated from the fish flesh by a generally linear relative movement between the filleting tool 36 and the fish 30. The filleting tool 36 is then withdrawn from the end of rib cage 32. The fins and tail are still attached to the fish 30. The fins and tail may be easily removed with a knife.

Figure 11:
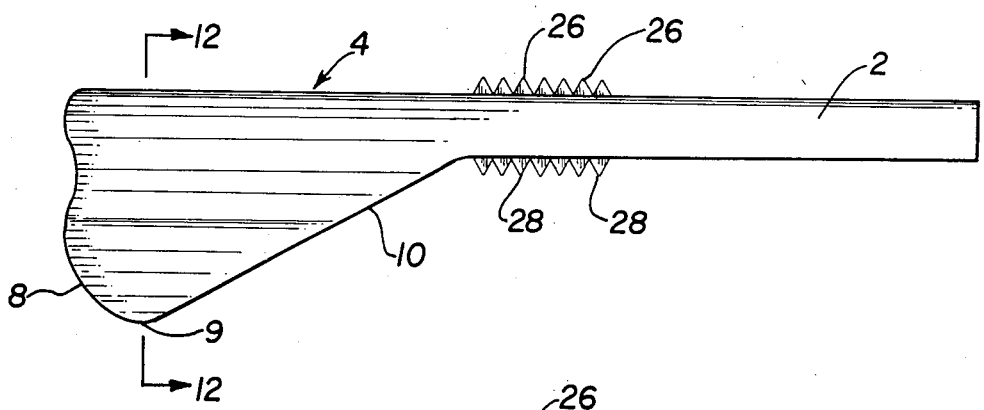
FIG. 11 is a side view of an alternate embodiment of a filleting tool.
Figure 12:
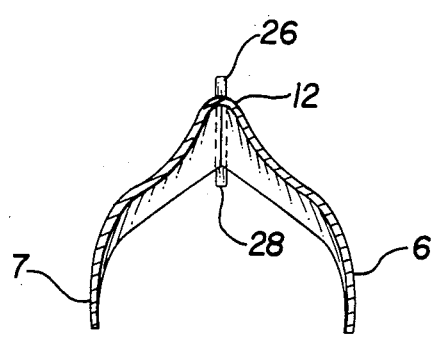
FIG. 12 is a cross sectional view of the filleting tool of FIG. 11, taken through 12—12.

FIGS. 11 and 12 show an alternate embodiment of the filleting tool. In the embodiment teeth 26, 28 may be placed along the handle 2. The teeth 26, 28 may be used to facilitate scaling or cleaning of the fish.

Figure 13:
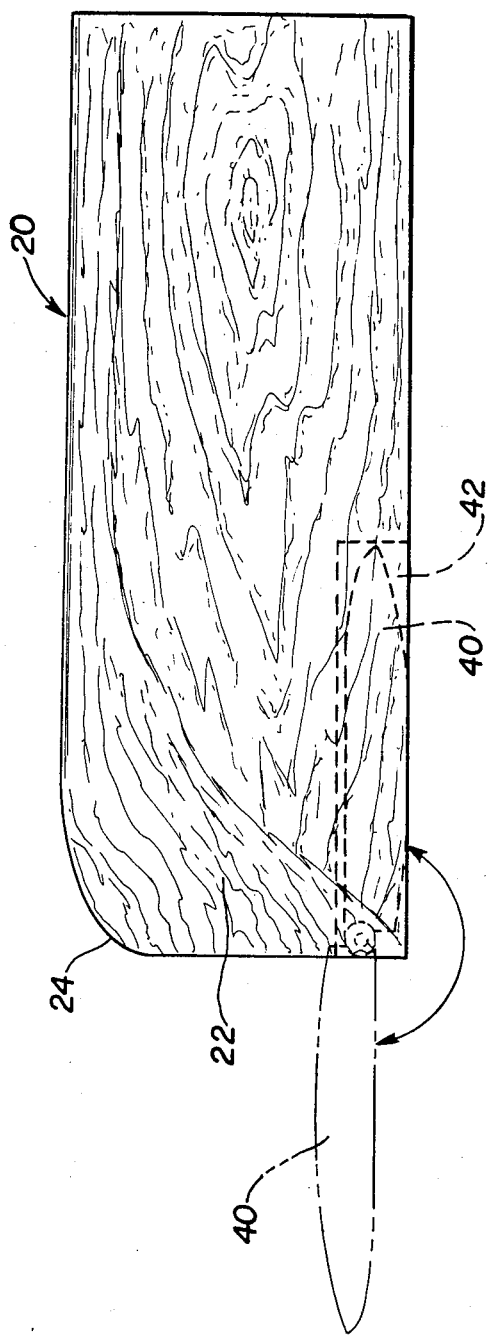
FIG. 13 is a side elevational view of an alternate embodiment of a block containing a blade means.
Figure 14:
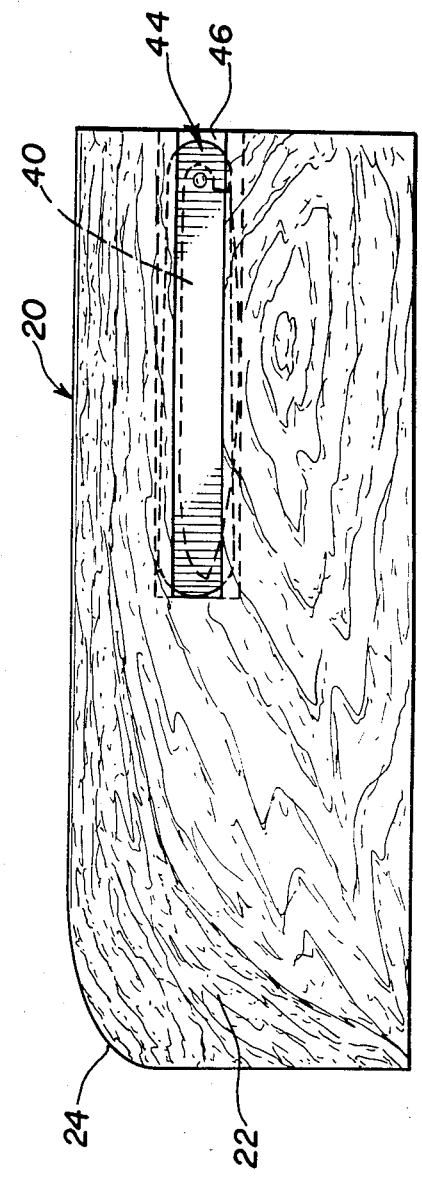
FIG. 14 is a side elevational view of an alternate embodiment of a block containing a blade means.
Figure 15:
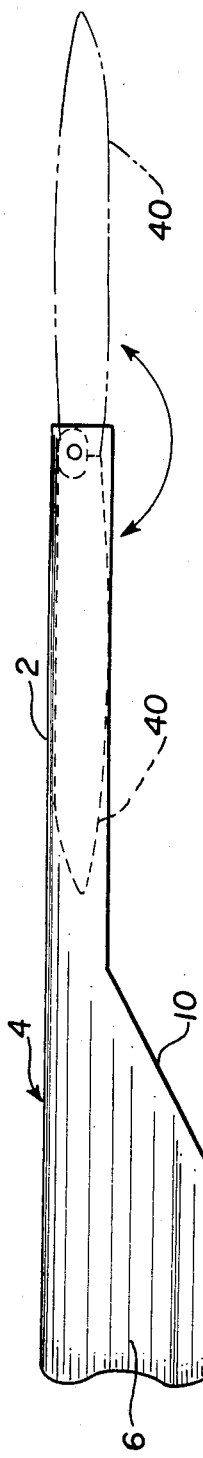
FIG. 15 is a side elevational view of an alternate embodiment of the filleting tool containing a blade means.

In embodiment of FIG. 13 a downwardly open recess is provided and a knife or cutting edge 40 is pivotably secured for storage in recess 42 or extension in a function position as shown to the left. An alternative is to provide a storage recess 46 as shown in FIG. 14, which can store a pen knife 40 and its casing 44 or a similar device.

Alternatively the filleting tool may contain a knife 40 that is preferably located in the handle. The knife may be extended beyond the handle 2 or stored within it.

Figure 17:
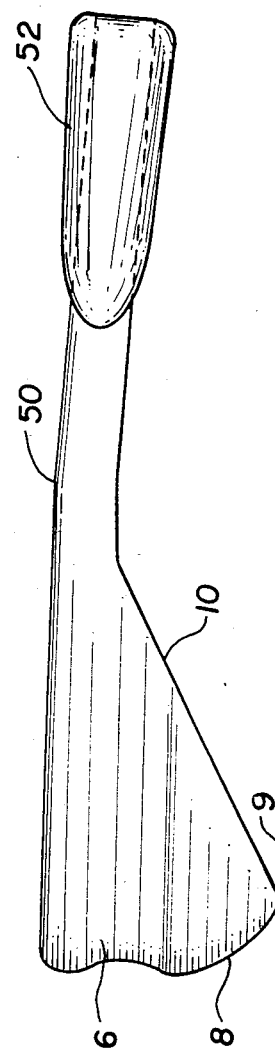
FIG. 17 is a side elevational view of an alternate embodiment of the filleting tool.

FIG. 17 shows a further embodiment of the filleting tool where the handle 50 is sloped slightly downwardly. Separately attached grip 52 enhances the users grasp on the tool.

The present invention discloses a fish filleting apparatus comprising a filleting tool, where the filleting tool has a handle and a hollow generally downwardly diverging hollow blade and a supporting block having a fish supporting portion and of such a size so as to pass through the hollow of the blade. The fish filleting apparatus is preferably used by placing the rib cage of a fish on the supporting block, securing the fish on the supporting block, inserting the filleting tool between the backbone and flesh of the fish and progressively moving the tool through the fish until reaching the end of the rib cage, resulting in the separation of the rib cage and flesh. Alternatively, the blade of the filleting tool could remain stationary while the supporting block and fish are moved. The filleting tool may contain teeth to enhance scaling. The tool may also have a knife attached to its handle. The tool handle, if desired, may be foldable. The block may contain a knife that is attached to the block and stored in a recess when not in use. The block may also contain a recess for storing the filleting tool.

Whereas, the filleting apparatus is preferably used with trout, it could be used with a wide variety of fish of different types and sizes.

Whereas particular embodiments of the invention have been described above for purposes of illustration, it will be appreciated by those skilled in the art that numerous variations of the details may be made without departing from the invention as described in the appended claims.

We claim:

1. Fish filleting apparatus comprising:
   a filleting tool;
   said filleting tool having a handle and a hollow generally downwardly diverging blade;
   said blade having a leading edge, a trailing edge, and an intermediate connecting edge;
   said leading edge is a cutting edge;
   a supporting block;
   said supporting block having a fish supporting portion and being of such size as to pass through the hollow of said blade whereby said filleting tool can effect said fish filleting empolying solely said leading edge by establishing relative movement in generally opposed directions between said supporting block and said filleting tool.

2. Fish filleting apparatus of claim 1 wherein said blade has two downwardly diverging lobes.

3. Fish filleting apparatus of claim 2 wherein said blade has said leading edge which extends rearwardly and downwardly to a lower point and a rearwardly, upwardly extending edge which merges into said handle.

4. Fish filleting apparatus of claim 3 wherein said blade is about 2 to 4 inches in length.

5. Fish apparatus of claim 4 wherein said leading edge is about 1¾ to 2 inches in height and about 1½ inches wide.

6. Fish filleting apparatus of claim 3 wherein said rearwardly, upwardly extending edge is flared.

7. Fish filleting apparatus of claim 1 wherein said handle and said blade are generally substantially rigid.

8. Fish filleting apparatus of claim 7 wherein said handle and said blade are composed of materials from the group selected of stainless steel, aluminum and plastic.

9. Fish filleting apparatus of claim 7 wherein said handle and said blade are a molded, stamped, or pressed unit.

10. Fish filleting apparatus of claim 9 wherein said filleting tool contains teeth.

11. A method of filleting a fish comprising:
    providing a fish, a supporting block having a fish supporting portion and being of such size as to pass through the hollow of a blade, and a filleting tool having a handle and a hollow generally downwardly diverging blade, said blade having a leading edge, a trailing edge, and an intermediate connecting edge, said leading edge being a cutting edge;
    placing the rib cage of the fish on said supporting block;
    securing said fish on said supporting block;
    inserting said tool between the backbone and flesh of said fish; and
    progressively moving said tool through said fish in a generally linear direction until reaching the end of said rib cage, whereby said rib cage will be separated from said flesh by a generally linear relative movement between said filleting tool and said fish.

12. The method of claim 11 including securing said rib cage in intimate generally complementary contact with said block prior to inserting said filleting tool.

13. The method of claim 11 wherein said blade has generally downwardly diverging lobes.

14. The method of claim 13 including employing a blade about 2 to 4 inches in length.

15. The method of claim 11 including employing a substantially rigid filleting tool.

16. The method of claim 11, wherein the small bones of the fish are deformed during siad progressive movement of said tool.

17. The method of claim 11, wherein said fish is eviscerated prior to filleting.

18. The method of claim 11, including after progressively moving said tool through said fish, said tool is withdrawn from said end of the rib cage.

* * * * *